Dec. 24, 1940.  C. K. MYERS  2,226,317
GRINDER PLATE CLEANER
Filed Aug. 17, 1939

Inventor
CECIL K. MYERS

By F. Gerald Toye
Attorney

Patented Dec. 24, 1940

2,226,317

UNITED STATES PATENT OFFICE 2,226,317

GRINDER PLATE CLEANER

Cecil K. Myers, Enid, Okla.

Application August 17, 1939, Serial No. 290,707

2 Claims. (Cl. 146—182)

This invention relates to a cleaning device for use with grinder knife plates.

The principal object of the invention is to provide a cleaning device which will clear the food particles remaining in the openings of the knife plate after the grinding operation.

Another object of the invention is to construct such a cleaning device of a molded plastic or the like which may be readily fitted or mated with the knife plate to simultaneously force out of the grinder openings residual material which ordinarily clogs the openings in the plate after it has been used.

Figure 1:
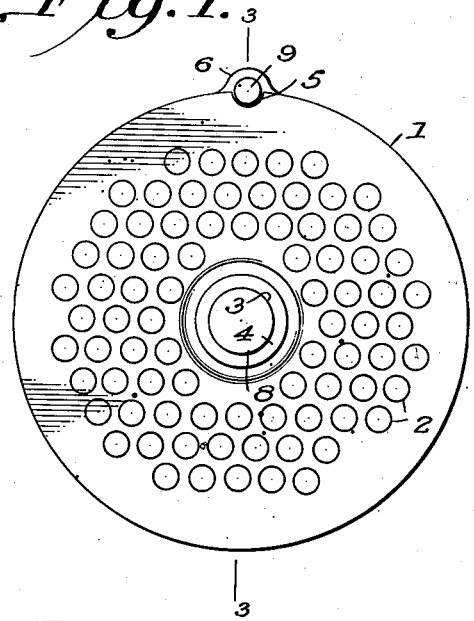
Fig. 1 is a front plan view of a food grinder knife plate with the cleaning device in mating relation therewith.
Figure 2:
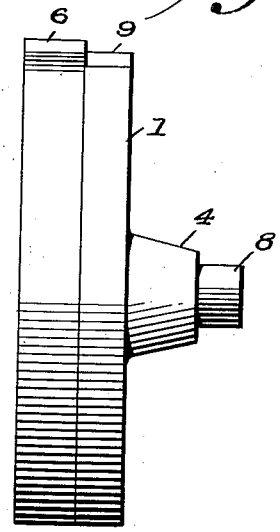
Fig. 2 is a side elevation of the mated plates.
Figure 3:
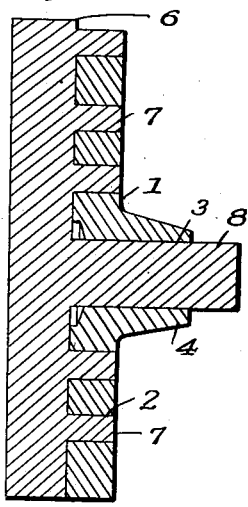
Fig. 3 is a vertical cross section of the plates taken on line 3—3 of Fig. 1.
Figure 4:
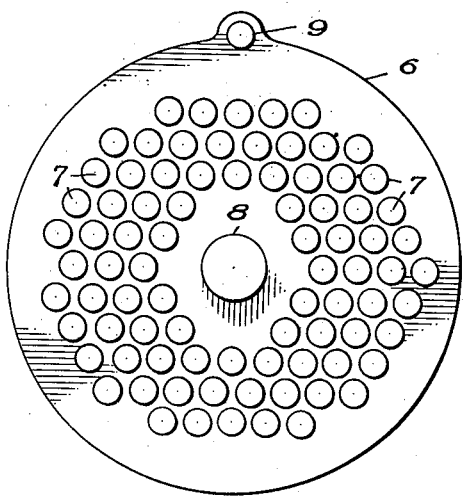
Fig. 4 is a front plan view of the cleaning device.
Figure 5:
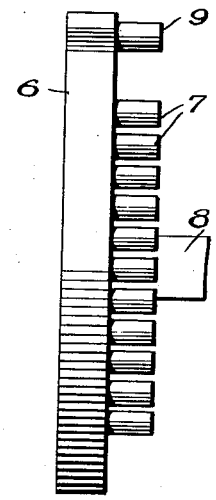
Fig. 5 is a side elevation of the grinder plate cleaning implement.

Specifically in the drawing, numeral 1 denotes a conventional food grinder knife plate of the type used in manual and power operated grinders. Usually these grinder plates are disc-like members having a plurality of spaced openings 2 therein for the passage of the ground food, and it is customary to provide these knife plates with a larger diameter central opening 3 in the plate having an extension 4 for the purpose of acting as a bearing for the end of the driven conveyor element to force the material to be ground through the openings 2 in the grinder knife plate 1.

The majority of grinder knife plates in use today are also notched at a point on their peripheries, as at 5, for cooperation with a pin on the grinder and cap to prevent rotation of the knife plate when it is subjected to heavy rotating pressure created by the turning of the material conveyor.

In use, as for instance in a meat market, many kinds and grades of meat must be ground during the day, and as the openings in the knife plate are ordinarily clogged after each grinding operation, it becomes a necessity to clean out this residue before the grinder can again be used. Usually this is done by removing the end cap and grinder plate, poking a wire through each of the individual openings, holding the knife under the faucet to wash the openings clean or by banging the knife against a hard surface. All of these methods of cleaning are tedious, time consuming and rarely completely clean out all of the food particles.

With the simple device which is the subject of the present invention all of the openings in the grinder plate may be easily and completely cleared of residual material simultaneously and with a minimum of effort. To this end, a unitary plate member 6 is provided having a plurality of vertically extending spaced pins 7 secured to or integrally formed on one flat side of the plate. The base plate 6 is made with the same diameter as the knife plate with which it is to be used while the upstanding pins 7 are formed with a very slightly smaller diameter than the perforations 2 and are arranged in a similar pattern to the openings of the grinder plate. The clearing device may be made of metal or wood, but preferably of a single piece of molded plastic material.

A central enlarged pin 8 is provided for passage through the center bore 3 in the knife plate and it will be observed that the pin 8 extends outwardly beyond the extension 4, while the smaller cleaning pins 7 terminate flush with the surface of the plate when the two plates are mated.

To assist in positioning or mating the pins of the clearing device with the openings in the grinder plate, it is preferable, though not essential to the successful operation of the device, to have a separate locating member or pin 9 secured at the peripheral edge of the pin plate to fit in the stop notch 5, previously described. Thus, it is a simple matter to place the grinder plate on elongated pin 8 and then match up the notch 5 and pin 9, after which the pins 7 will be in position for mating with their respective openings 2.

To facilitate removal of the mated plates, the elongated central pin 8 need only be pressed or tapped to separate the two plates.

What I claim is:

1. A cleaning device for simultaneously removing material from the series of openings in a grinder knife plate which includes a one piece unitary plastic cooperating member provided with a plurality of integral cleaning pins of a length equal to the thickness of the plate and corresponding to the entire series of openings in the knife plate, one of said integral pins positioned at the center of said member being of greater length than the remainder of said pins and adapted to extend beyond the surface of said knife plate when said plate and said cooperating member are mated and a guide pin of the same height as the cleaning pins on said cooperating member to facilitate the mating thereof with the knife plate.

2. The combination of a meat grinder knife plate of the type having a center opening and a plurality of perforations therethrough, with a cleaning element therefor comprising a support carrying a plurality of pins on one side thereof, said pins being of the same length as the thickness of said plate and of the same cross section as said perforations and arranged in the same pattern, a pin on said support of substantially the same diameter as and adapted to extend through the center opening in said knife plate, said pin being of greater length than the thickness of said plate at said center opening.

CECIL K. MYERS.